United States Patent
Miyatani

(10) Patent No.: US 8,094,708 B2
(45) Date of Patent: Jan. 10, 2012

(54) RECEIVER WITH MULTIPLE ANTENNAS AND METHOD OF RECEIVING SIGNALS

(75) Inventor: Tetsuhiko Miyatani, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 719 days.

(21) Appl. No.: 12/195,100

(22) Filed: Aug. 20, 2008

(65) Prior Publication Data

US 2009/0129456 A1 May 21, 2009

(30) Foreign Application Priority Data

Nov. 21, 2007 (JP) .................. 2007-301919
Apr. 3, 2008 (KR) .................. 10-2008-0031274

(51) Int. Cl.
*H03H 7/30* (2006.01)
(52) U.S. Cl. ........ 375/232; 375/347; 375/260; 375/299; 375/348; 375/350; 375/285; 455/59; 455/63.2; 455/132
(58) Field of Classification Search .................. 375/347, 375/260, 299, 349, 350, 348, 232, 285; 455/59, 455/63.2, 132
See application file for complete search history.

(56) References Cited

U.S. PATENT DOCUMENTS

| 7,787,555 | B2 * | 8/2010 | Kim et al. | 375/267 |
| 2007/0155433 | A1 * | 7/2007 | Ito et al. | 455/562.1 |
| 2007/0280335 | A1 * | 12/2007 | Kim et al. | 375/147 |
| 2008/0056396 | A1 * | 3/2008 | Li | 375/260 |

* cited by examiner

*Primary Examiner* — Khanh C Tran
*Assistant Examiner* — Rahel Guarino
(74) *Attorney, Agent, or Firm* — NSIP Law

(57) ABSTRACT

Provided are a multiple antenna receiver and a method of receiving a signal. A multiple antenna receiver includes a plurality of antennas to receive a plurality of received symbols, a QR decomposition unit to perform QR decomposition for a channel matrix, a Q-received symbol generator to generate Q-received symbols corresponding to the plurality of antennas, a subtractor to remove a component corresponding to at least one neighbor symbol from a target received symbol corresponding to one of the Q-received symbols, an adder to add a signal component to the target received symbol, a first FDE to perform frequency domain equalization for an output of the subtractor, and a second FDE to perform frequency domain equalization for an output of the adder.

18 Claims, 8 Drawing Sheets

RECEIVER WITH MULTIPLE ANTENNAS AND METHOD OF RECEIVING SIGNALS

CROSS-REFERENCE TO RELATED APPLICATIONS

This application claims the benefit under 35 U.S.C. §119(a) of Japanese Patent Application No. 2007-301919, filed on Nov. 21, 2007 in the Japan Patent Office, and of Korean Patent Application No. 2008-31274, filed on Apr. 3, 2008 in the Korean Intellectual Property Office, the entire disclosures of which are incorporated herein by reference.

TECHNICAL FIELD

The following description relates to a receiver and a method of receiving signals, and more particularly, a receiver for separating a plurality of received symbols and detecting each separated received symbol and a method of receiving signals.

BACKGROUND

Many researches are being conducted to provide various types of multimedia services including voice services and to support high-speed data transmission in a wireless communication environment. As part of the effort, technology associated with a Multiple-Input Multiple-Output (MIMO) system using multiple channels in a spatial area is in rapid development.

MIMO technology may increase the number of channel bits in limited frequency resources and thereby provide a high data rate using multiple antennas. Also, since MIMO technology uses a plurality of transmitting/receiving antennas in a channel environment with sufficient scattering bodies, MIMO technology may theoretically provide channel capacity in proportion to a fewer number of antennas between a number of transmitting antennas and a number of receiving antennas.

In a MIMO communication system, a plurality of paths exists between a transmitter and a receiver. Transmission symbols of the transmitter may be transmitted to the receiver via the plurality of paths. For examples, where a number of antennas of the transmitter and a number of antennas of the receiver are "4", vector Y consisting of received symbols may be represented as, $$Y = \begin{bmatrix} y_1 \\ y_2 \\ y_3 \\ y_4 \end{bmatrix}$$
$$= \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} x_1 \\ x_2 \\ x_3 \\ x_4 \end{bmatrix} + \begin{bmatrix} n_1 \\ n_2 \\ n_3 \\ n_4 \end{bmatrix}$$
$$= HX + N$$

[Equation 1]

where $x_1$, $x_2$, $x_3$, and $x_4$ are transmission symbols, $h_{ab}$ is a channel coefficient corresponding to a path until a $b^{th}$ transmission symbol reaches an $a^{th}$ receiving antenna, and $n_1$, $n_2$, $n_3$, and $n_4$ are noise.

The receiver may separate received symbols for each substream and detect transmission symbols based on the separated received symbols. However, since multi-path interference occurs between a plurality of paths and multi-path interference corresponding to each of the plurality of paths is independent, it is difficult to accurately detect the received symbols. In addition, distortion by the multi-path interference makes it difficult to accurately detect the received symbols.

SUMMARY

According to an aspect, there is provided a multiple antenna receiver comprising a plurality of antennas to receive a plurality of received symbols, a QR decomposition unit to perform QR decomposition for a channel matrix to calculate a Q matrix and an R matrix, a Q-received symbol generator to generate Q-received symbols corresponding to the plurality of antennas based on the plurality of received symbols and the Q matrix, a subtractor to remove a component corresponding to at least one neighbor symbol from a target received symbol corresponding to one of the Q-received symbols, an adder to add a signal component to the target received symbol so that a variation of the at least one neighbor symbol in a frequency domain is equal to a variation of the target received symbol in the frequency domain, a first frequency domain equalizer to perform frequency domain equalization for an output of the subtractor, and a second frequency domain equalizer to perform frequency domain equalization for an output of the adder.

The antenna receiver may further comprise a detector to detect a target transmission symbol corresponding to the target received symbol based on an output of the second frequency domain equalizer and a neighbor transmission symbol corresponding to the at least one neighbor symbol.

The detector may detect the target transmission symbol based on a maximum-likelihood detection (MLD) scheme.

The detector may calculate an R' matrix based on the R matrix and an equalization coefficient of the second frequency domain equalizer, and detects the target transmission symbol based on the calculated R' matrix.

The Q-received symbol generator may perform an inner product operation for a vector including the plurality of received symbols and a $Q^H$ matrix to generate the Q-received symbols, the $Q^H$ matrix being a Hermitian matrix of the Q matrix.

The subtractor may calculate a subtraction coefficient based on the R matrix and removes the component corresponding to the at least one neighbor symbol from the target received symbol based on the calculated subtraction coefficient.

The adder may calculate an addition coefficient so that the variation of the at least one neighbor symbol in the frequency domain is equal to the variation of the target received symbol in the frequency domain, and adds the signal component to the target received symbol based on the calculated addition coefficient.

The adder may add the signal component to the target received symbol based on an average vector of a substream including the at least one neighbor symbol.

The first frequency domain equalizer and the second frequency domain equalizer may calculate equalization coefficients of the first frequency domain equalizer and the second frequency domain equalizer based on the R matrix, and perform frequency domain equalization for the output of the subtractor and the output of the adder based on the calculated equalization coefficients.

The first frequency domain equalizer and the second frequency domain equalizer may perform frequency domain equalization for the output of the subtractor and the output of the adder according to a minimum mean square error (MMSE) equalization scheme.

According to another aspect, there is provided a method of receiving a signal, comprising recognizing a plurality of received symbols via a plurality of antennas, performing QR decomposition for a channel matrix to calculate a Q matrix and an R matrix, generating Q-received symbols corresponding to the plurality of antennas based on the plurality of received symbols and the Q matrix, removing a component corresponding to at least one neighbor symbol from a target received symbol corresponding to one of the Q-received symbols, adding a signal component to the target received symbol so that a variation of the at least one neighbor symbol in a frequency domain is equal to a variation of the target received symbol in a frequency domain, performing frequency domain equalization for a first signal in which the component corresponding to the at least one neighbor symbol is removed from the target received symbol, and performing frequency domain equalization for a second signal in which a component corresponding to the variation of the at least one neighbor symbol in the frequency domain is added to the target received symbol.

The method may further comprise detecting a target transmission symbol corresponding to the target received symbol based on the frequency domain equalized second signal and a neighbor transmission symbol corresponding to the at least one neighbor symbol.

The detecting may comprise calculating an R' matrix based on the R matrix and an equalization coefficient that is used to perform frequency domain equalization for the second signal, and detecting the target transmission symbol based on the calculated R' matrix.

The removing may comprise calculating a subtraction coefficient based on the R matrix and removing the component corresponding to the at least one neighbor symbol from the target received symbol based on the calculated subtraction coefficient.

The adding may comprise calculating an addition coefficient so that the variation of the at least one neighbor symbol in the frequency domain is equal to the variation of the target received symbol in the frequency domain, and adding the signal component to the target received symbol based on the calculated addition coefficient.

The performing frequency domain equalization for the first signal and the second signal may comprise calculating equalization coefficients based on the R matrix to perform frequency domain equalization based on the calculated equalization coefficients.

According to still another aspect, there is provides a multiple antenna receiver which performs QR decomposition for a channel matrix and detects transmission symbols based on a Q matrix and an R matrix.

According to still another aspect, there is provides a multiple antenna receiver which compensates for signal distortion by multi-path interference using an adder, a subtractor, and a frequency domain equalizer.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
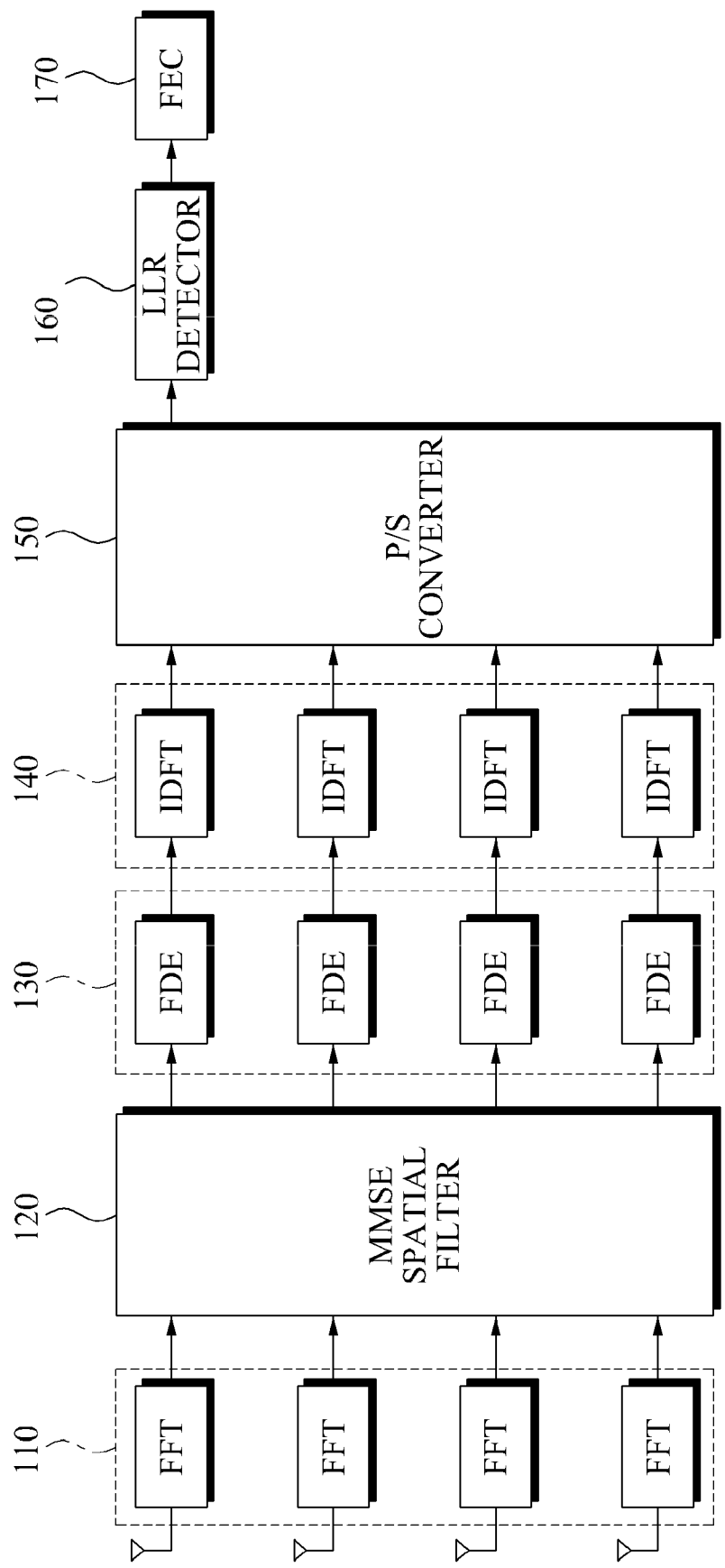
FIG. 1 is a block diagram illustrating a multiple antenna receiver including a minimum mean square error (MMSE) spatial filter according to an exemplary embodiment.

FIG. 1 illustrates a multiple antenna receiver 100 according to an exemplary embodiment.

Referring to FIG. 1, the multiple antenna receiver 100 comprises four receiving antennas, fast Fourier transforms (FFTs) 110 corresponding to the receiving antennas, a minimum mean square error (MMSE) spatial filter 120, frequency domain equalizers (FDEs) 130, inverse discrete Fourier transforms (IDFTs) 140, a parallel-to-serial (P/S) converter 150, a log-likelihood ratio (LLR) detector 160, and a forward error correction (FEC) 170.

Here, it is assumed that a transmitting end transmitted transmission symbols $x_1$, $x_2$, $x_3$, and $x_4$ via channel H. The four receiving antennas of the multiple antenna receiver 100 receive four received symbols $y_1$, $y_2$, $y_3$, and $y_4$ as shown in Equation 1.

The FFTs 110 may transform the received symbols $y_1$, $y_2$, $y_3$, and $y_4$ to frequency domain signals. The MMSE spatial filter 120 may filter the received symbols $y_1$, $y_2$, $y_3$, and $y_4$ based on a coefficient disclosed in the following Equation 2:

$$\frac{H^H}{H^H H + \frac{N}{S}} \qquad \text{[Equation 2]}$$

where S is the power of transmission symbols.

If a noise term is ignored, the coefficient disclosed in Equation 2 may be represented as, $$\frac{H^H}{H^H H}. \qquad \text{[Equation 3]}$$

The MMSE spatial filter 120 may perform an inner product operation for a vector consisting of received symbols and the coefficient disclosed in Equation 3, as given by, $$\frac{H^H}{H^H H}Y = \frac{H^H}{H^H H}HX + \frac{H^H}{H^H H}N \quad \text{[Equation 4]}$$
$$= X + \frac{H^H}{H^H H}N.$$

From Equation 4, it may be known that the received symbols are separated for each substream.

The FDEs 130 may perform frequency domain equalization for an output of the MMSE spatial filter 120. Through this, it is possible to compensate for distortion by multi-path interference.

Also, the IDFTs 140 may transform an output of the FDEs 130 to a time domain signal. An output of the IDFTs 140 may be multiplexed via the P/S converter 150.

The LLR detector 160 may detect an LLR of an output of the P/S converter 150. The FEC 211 may perform error correction based on the detected LLR.

Since the multiple antenna receiver 100 uses a two dimensional (2D)-MMSE scheme, it may be difficult to obtain diversity gain corresponding to the number of receiving antennas. Therefore, a multiple antenna receiver 200 shown in FIG. 2 may be proposed to obtain the diversity gain corresponding to the number of receiving antennas.

Figure 2:
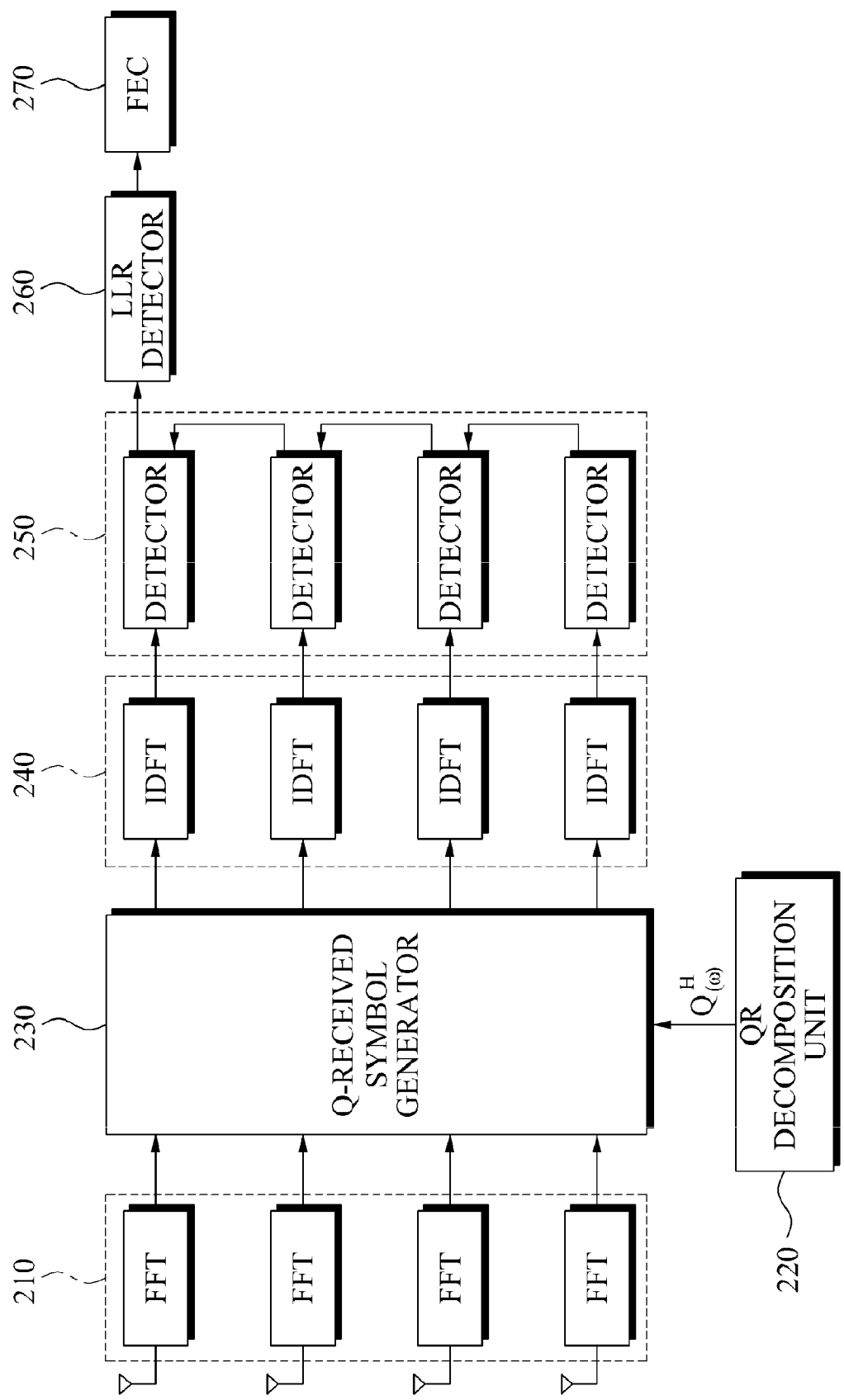
FIG. 2 is a block diagram illustrating a multiple antenna receiver including a QR decomposition unit according to an exemplary embodiment.

FIG. 2 illustrates a multiple antenna receiver 200 according to an exemplary embodiment.

Referring to FIG. 2, the multiple antenna receiver 200 comprises four receiving antennas, FFTs 210 corresponding to the receiving antennas, a QR decomposition unit 220, a Q-received symbol generator 230, IDFTs 240, detectors 250, an LLR detector 260, and an FEC 270.

The FFTs 210 may transform the received symbols to frequency domain signals.

The QR decomposition unit 220 may perform QR decomposition for a channel matrix H to calculate a Q matrix and an R matrix.

The Q-received symbol generator 230 may perform an inner product operation for $Q^H(w)$ and vector Y consisting of the received symbols as given by the following Equation 5. Here, $Q^H(w)$ is $Q^H$ in the frequency domain. Hereinafter, for convenience of description, outputs of the Q-received symbol generator may be referred to as "Q-received symbols".

$$Q^H Y = Q^H HX + Q^H N \quad \text{[Equation 5]}$$
$$= Q^H QRX + Q^H N$$
$$= RX + Q^H N.$$

$Q^H Y$ may be represented as, $$Q^H Y = \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} X_0 \\ X_1 \\ X_2 \\ X_3 \end{bmatrix} + Q^H \begin{bmatrix} n_0 \\ n_1 \\ n_2 \\ n_3 \end{bmatrix}. \quad \text{[Equation 6]}$$

Referring to Equation 6, since the multiple antenna receiver 200 is aware of the R matrix and the Q matrix, it is possible to sequentially detect $X_3$, $X_2$, $X_1$, and $X_0$.

The IDFTs 240 may transform the Q-received symbols corresponding to the outputs of the Q-received symbol generator 230 to time domain signals.

Referring to Equation 5 and Equation 6, since the R matrix is an upper triangular matrix, $X_3$, $X_2$, $X_1$, and $X_0$ may be sequentially detected with less calculation amount.

The detectors 250 may sequentially detect $X_3$, $X_2$, $X_1$, and $X_0$ based on the R matrix. Specifically, a bottom detector, i.e. the detector positioned in a fourth stage may detect $X_3$ using $R_{33}$ and transfer a detection result to the detector positioned in a third stage. A detection result of the third stage detector may be transferred to the detector positioned in a second stage. A detection result of the second stage detector may be transferred to the detector positioned in a first stage. Therefore, $X_3$, $X_2$, $X_1$, and $X_0$ may be sequentially detected via the detectors 250.

The detectors 250 may detect transmission symbols based on Euclid distance, as given by, $$\arg\min_{Xs} \|Q^H Y - RXs\|, \quad \text{[Equation 7]}$$

where Xs is a candidate transmission symbol that is an available transmission symbol. For example, where a modulation scheme is a 16 quadrature amplitude modulation (16-QAM) scheme, a number of candidate transmission symbols is 16.

The LLR detector 260 may detect an LLR. The FEC 270 may correct an error based on the detected LLR. Therefore, the multiple antenna receiver 200 may obtain diversity gain corresponding to a number of receiving antennas and detect transmission symbols with less calculation amount.

Figure 3:
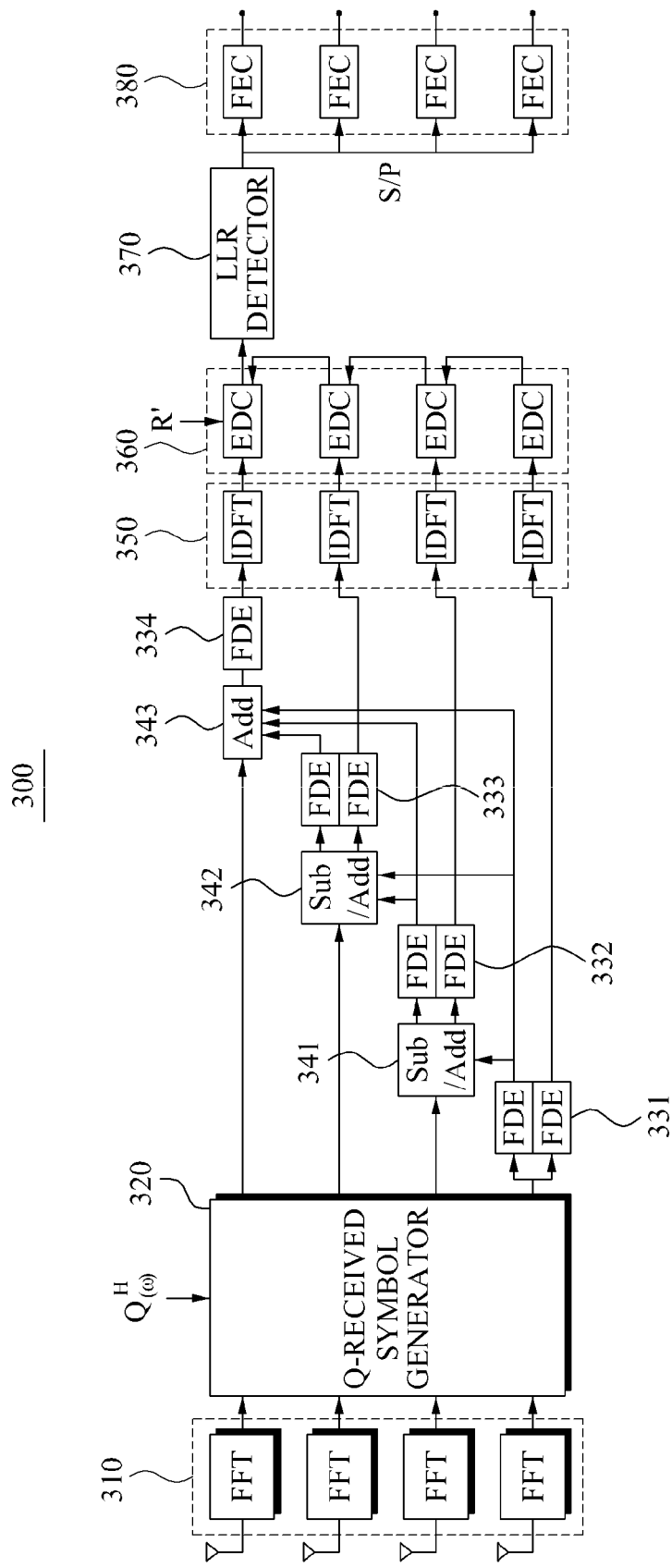
FIG. 3 is a block diagram illustrating a multiple antenna receiver according to an exemplary embodiment.

FIG. 3 illustrates a multiple antenna receiver 300 according to an exemplary embodiment.

Referring to FIG. 3, the multiple antenna receiver 300 comprises four receiving antennas, FFTs 310, a Q-received symbol generator 320, subtractors/adders 341 and 342, an adder 343, FDEs 331, 332, 333, and 334, IDFTs 350, Euclidean distance calculation (EDCs) 360, an LLR detector 370, and FECs 380.

Four received symbols that are received via four receiving antennas may be transformed to frequency domain signals by the FFTs 310, respectively.

The Q-received symbol generator 320 may output four Q-received symbols that are calculated based on the received symbols and the Q matrix according to Equation 6. Specifically, the Q-received symbol generator 320 may perform an inner product operation for a vector consisting of the received symbols and $Q^H$ to output the four Q-received symbols.

An output from a fourth stage of the Q-received symbol generator 320 may be input into two FDEs 331. The two FDEs 331 may perform frequency domain equalization for the output from the fourth stage of the Q-received symbol generator 320 and then provide one of two outputs to one IDFT and anther output to the subtractors/adders 341 and 342, and the adder 343 that are positioned in the first stage, the second stage, and the third stage.

According to an aspect, the IDFT and the EDC positioned in the fourth stage may detect $X_3$ using Euclid distance, based on R' matrix. The R' matrix is transformed from the R matrix. The fourth stage EDC may provide detected $X_3$ to the EDC positioned in a third stage. The third stage EDC may detect $X_2$ based on the detected $X_3$. The R' matrix will be further described below.

The subtractor/adder 341 may receive any one of two outputs from the FDEs 331 that are positioned in the fourth stage.

The subtractor included in the subtractor/adder 341 may remove a component corresponding to a Q-received symbol of the fourth stage from a Q-received symbol of the third stage. Specifically, the subtractor included in the subtractor/adder 341 may multiply an output of the fourth stage FDE by a particular subtraction coefficient and then subtract the result of the multiplication from the Q-received symbol of the third stage.

The adder included in the subtractor/adder 641 may add a particular signal component to the Q-received symbol of the third stage so that a variation of the Q-received symbol of the third stage in the frequency domain is equal to a variation of the Q-received symbol of the fourth stage in the frequency domain. Specifically, the adder included in the subtractor/adder 341 may multiply the Q-received symbol of the fourth stage by a particular addition coefficient and then add the result of the multiplication to the Q-received symbol of the third stage.

The two outputs of the subtractor/adder 341 may be provided to the two FDEs 332. The FDEs 332 may perform frequency domain equalization for the outputs. The FDDs 332 may generate two outputs. One of them may be provided to the subtractor/adder 342. Another output may be provided to the IDFT and then to the EDC that are positioned in the third stage.

The subtractor/adder 342 may receive any one of the two outputs from the FDEs 332. The subtractor included in the subtractor/adder 342 may remove a component corresponding to the Q-received symbol of the second stage and a component corresponding to the Q-received symbol of the fourth stage from the output of the FDE positioned in the second stage, based on a predetermined subtraction coefficient.

Also, the adder included in the subtractor/adder 342 may add a particular signal component to the Q-received symbol of the second stage so that a variation of the Q-received symbol of the fourth stage in the frequency domain, a variation of the Q-received symbol of the third stage in the frequency domain, and a variation of the Q-received symbol of the second stage in the frequency domain may be equal to each other.

The two FDEs 333 may receive two outputs of the subtractor/adder 342 and perform frequency domain equalization for the received two outputs. One of the outputs of the FDEs 333 may be input into the IDFT positioned in the second stage and then be detected via the EDC positioned in the second stage. Another output of the FDEs 333 may be provided to the adder 343.

The adder 343 may receive the Q-received symbol of the first stage and outputs of the FDEs 331, 332, and 333. The adder 343 may add a particular signal component to the Q-received symbol of the first stage so that the variation of the Q-received symbol of the fourth stage in the frequency domain, the variation of the Q-received symbol of the third stage in the frequency domain, the variation of the Q-received symbol of the second stage in the frequency domain, and a variation of the Q-received symbol of the first stage in the frequency domain may be equal to each other. The first stage is a most-upper stage and thus the subtractor is not a necessity.

An output of the adder 343 may be equalized in the frequency domain via the FDE 334 and then be detected via the IDFTs 350 and the EDCs 360.

The LLR detector 370 may detect an LLR and provide the detected LLR to the FECs 380. The FECs 380 may correct an error. Since it is assumed that the multiple antenna receiver 300 is a base station in a multi-user MIMO communication system, the FECs 380 may exist. If it is assumed that the multiple antenna receiver 300 is a base station in a single user MIMO communication system, a single FEC may be required.

Figure 4:
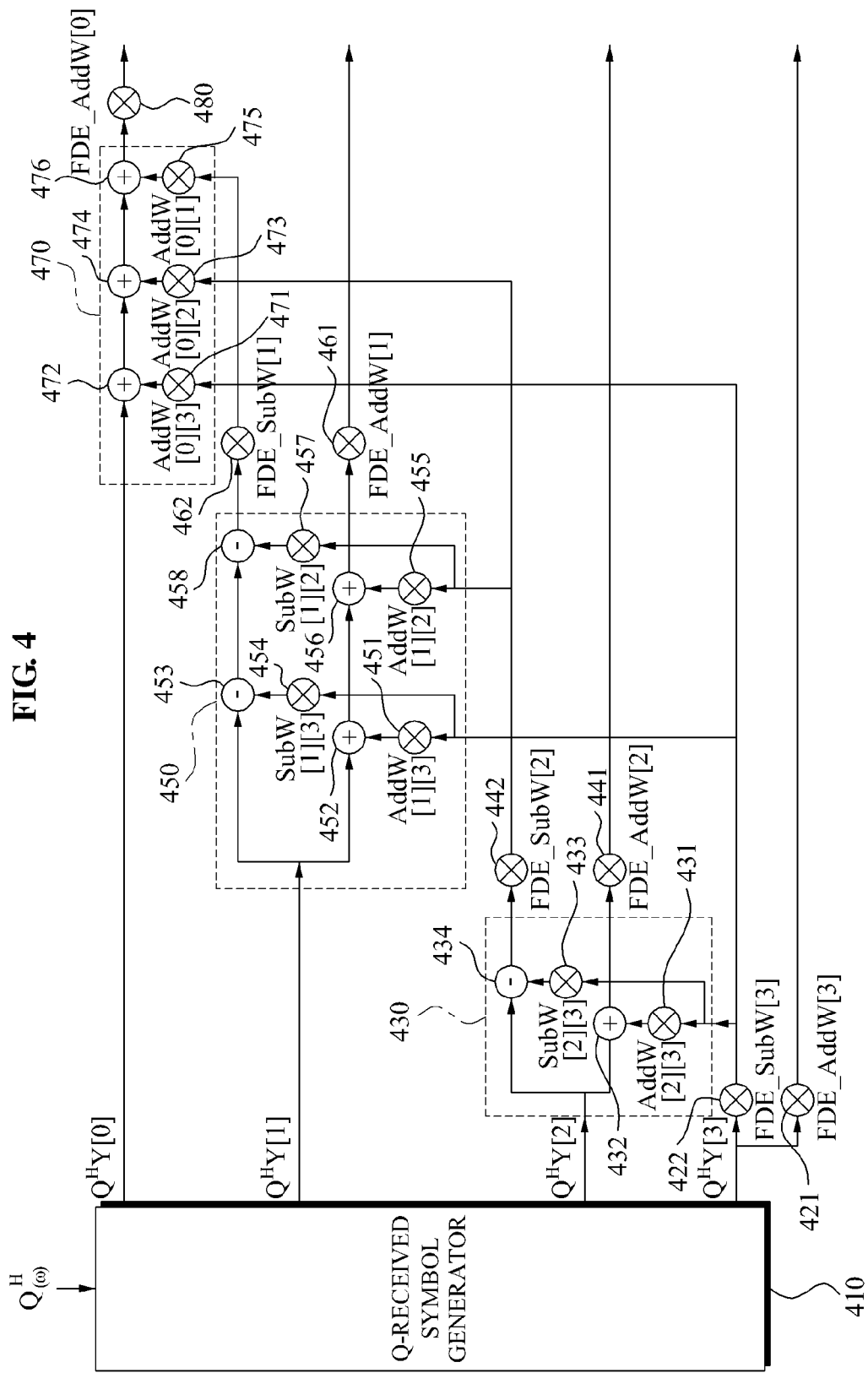
FIG. 4 is a diagram illustrating an exemplary operation of subtractors/adders, and frequency domain equalizers (FDEs) shown in FIG. 3.

FIG. 4 illustrates an operation of the subtractors/adders 341 and 342, and the FDEs 331, 332, 333, and 334 shown in FIG. 3 according to an exemplary embodiment.

Referring to FIG. 4, a Q-received symbol generator 410 may output a Q-received symbol for each stage. The Q-received symbol generator 410 may output $Q^H Y[3]$, $Q^H Y[2]$, $Q^H Y[1]$, and $Q^H Y[0]$ for stages respectively. Here, Y[x] denotes an $x^{th}$ element of vector Y.

The two FDEs 331 shown in FIG. 3 may equalize $Q^H Y[3]$ based on FDE_AddW[3] and FDE_SubW[3] corresponding to equalization coefficients. In this case, an upper FDE of the FDEs 331 may correspond to a multiplier 422. A lower FDE of the FDEs 331 may correspond to another multiplier 421.

The multiplier 421 may perform an inner product operation for FDE_AddW[3] and $Q^H Y[3]$. The multiplier 422 may perform an inner product operation for FDE_SubW[3] and $Q^H Y[3]$. According to an aspect, FDE_AddW[3] and FDE_SubW[3] may be represented as, $$\frac{R_{33}^H}{R_{33}^H R_{33} + \frac{N}{S}}.$$  [Equation 8]

An output of the multiplier 422 may be provided to the subtractor/adder 430 positioned in the third stage.

Still another multiplier 431 may perform an inner product operation for the output of the multiplier 422 and AddW[2][3] corresponding to an addition coefficient. An adder 432 may add an output of the multiplier 431 to $Q^H Y[2]$, so that a variation of $Q^H Y[3]$ in the frequency domain may be equal to a variation of $Q^H Y[2]$ in the frequency domain.

AddW[2][3] may be represented as, $$AddW_{[2][3]}(\omega) = \left(\frac{\overline{R_{23}}}{\overline{R_{22}}} R_{22} - R_{23}\right),$$  [Equation 9]

where $\overline{R_{xy}}$ is an average vector of a y substream in a stage x.

The output of the multiplier 422 may be provided to still another multiplier 433. The multiplier 433 may perform an inner product operation for the output of the multiplier 422 and SubW[2][3] corresponding to a subtraction coefficient. An output of the multiplier 433 may be provided to a subtractor 434. The subtractor 434 may subtract the output of the multiplier 433 from $Q^H Y[2]$. Therefore, a component corresponding to $Q^H Y[3]$ may be removed from $Q^H Y[2]$. SubW[2][3] may be represented as, $$SubW_{[2][3]}(\omega) = R23$$  [Equation 10]

The output of the adder 432 may be represented as, $$\{Q^H Y\}[2] + AddW[2][3]FDE\_Sub[3]\{Q^H Y\}[3] =$$  [Equation 11]
$$R_{22} X_2 + R_{23} X_3 +$$
$$n_2 + \left(\frac{\overline{R_{23}}}{\overline{R_{22}}} R_{22} - R_{23}\right) \frac{R_{33}^H}{R_{33}^H R_{33} + \frac{N}{S}} (R_{33} X_3 + n_3) =$$

$$R_{22}X_2 + R_{23}X_3 + n_2 + \left(\frac{\overline{R_{23}}}{\overline{R_{22}}}R_{22} - R_{23}\right)X_3 \because highSNR =$$

$$R_{22}X_2 + \frac{\overline{R_{23}}}{\overline{R_{22}}}R_{22}X_3 + n_2 = R_{22}\left\{X_2 + \frac{\overline{R_{23}}}{\overline{R_{22}}}X_3\right\} + n_2.$$

It is assumed herein that n3 or noise of the equalization coefficient is zero.

Still another multiplier 442 corresponding to the FDE positioned in the third stage may perform an inner product operation for the output of the subtractor 434 and FDE_SubW[2] corresponding to an equalization coefficient. The equalization coefficient FDE_SubW[2] may be represented as, $$FDE\_SubW[2] = \frac{R_{22}^H}{R_{22}^H R_{22} + \frac{N}{S}}.$$ [Equation 12]

Still another multiplier 441 may perform an inner product operation for the output of the adder 432 and FDE_AddW[2]. FDE_AddW[2] may be represented as, $$FDE\_AddW[2] = \frac{R_{22}^H R_{2Sum}}{R_{22}^H R_{22} R_{2Sum} + \frac{N}{S}},$$ [Equation 13]

$$R_{2Sum} = \frac{\sum_{m=2}^{3} |\overline{R_{2m}}|^2}{|\overline{R_{22}}|^2}.$$

The size of N/S may be set to an appropriate value based on a communication environment.

Subtraction coefficient SubW[x][y], addition coefficient AddW[x][y], and equalization coefficients FDE_SubW[x] and FDE_AddW[x] that are used for each stage may be generalized as given by, $$SubW_{[x][y]} = R_{xy},$$ [Equation 14]

$$AddW_{[x][y]} = \left(\frac{\overline{R_{xy}}}{\overline{R_{xx}}}R_{xx} - R_{xy}\right),$$

$$FDE\_SubW_{[x]} = \frac{R_{xx}^H}{R_{xx}^H R_{xx} + \frac{N}{S}},$$

$$FDE\_AddW_{[x]} = \frac{R_{xx}^H R_{xSum}}{R_{xx}^H R_{xx} R_{xSum} + \frac{N}{S}},$$

$$R_{xSum} = \frac{\sum_{m=x}^{N_{RX}-1} |\overline{R_{xm}}|^2}{|\overline{R_{xx}}|^2}.$$

Since Q-received symbols are changed a little due to the existence of the subtractor or the adder, it may be required to correct the R matrix to the R' matrix.

In this instance, the R' matrix may be represented as, $$R'_{xy} = (R_{xy} + R_{yy}W_{suby}AddW_{xy})W_{addx}$$ [Equation 15]

$$= \left\{R_{xy} + \left(\frac{\overline{R_{xy}}}{\overline{R_{xx}}}R_{xx} - R_{xy}\right)\frac{|R_{yy}|^2}{|R_{yy}|^2 + \frac{N}{S}}\right\}$$

$$\frac{R_{xx}^H R_{xSum}}{|R_{xx}|^2 R_{xSum} + \frac{N}{S}},$$

$$R_{xSum} = \frac{\sum_{m=x}^{N_{RX}-1} |\overline{R_{xm}}|^2}{|\overline{R_{xx}}|^2}.$$

Since processes associated with substreams of the third and the second stages are described above, processes associated with the first and the second stages will be omitted here.

As described above, a multiple antenna receiver according to an exemplary embodiment may correct a signal of a lower stage in a particular stage via an adder and equalize a signal variation in the frequency domain for each stage, compensating for distortion by multi-path interference. Also, the multiple antenna receiver may remove, from a signal of the particular stage, a component corresponding to the signal of the lower stage via a subtractor, effectively detecting a transmission symbol.

Figure 5:
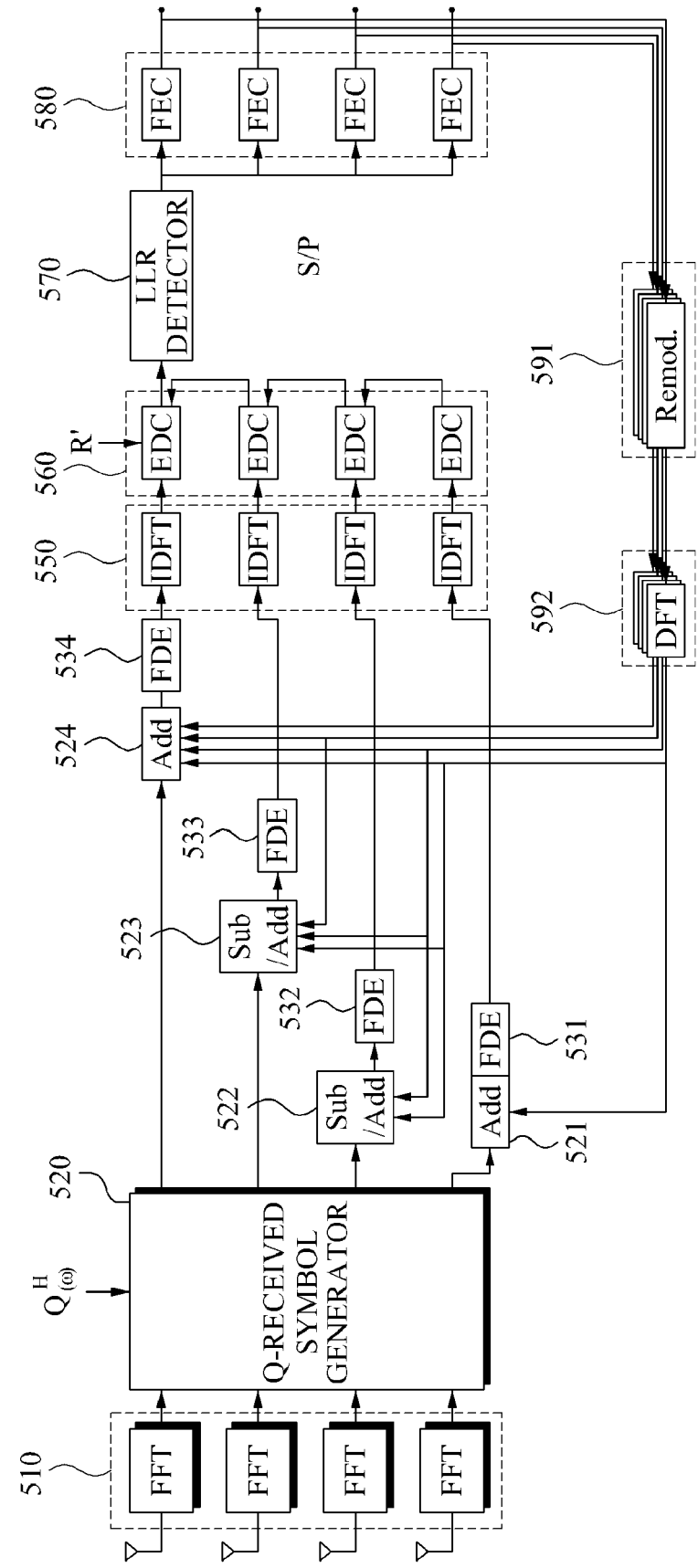
FIG. 5 is a block diagram illustrating a multiple antenna receiver according to an exemplary embodiment.

FIG. 5 illustrates a multiple antenna receiver 500 according to an exemplary embodiment.

Referring to FIG. 5, the multiple antenna receiver 500 comprises four receiving antennas, FFTs 510, a Q-received symbol generator 520, and the like. It is understood that other blocks in FIG. 5 may be correspond to those same text referenced blocks in FIGS. 3 and 4 and/or understood by one skilled in the art in view of the instant disclosure.

A basic operation of the multiple antenna receiver 500 shown in FIG. 5 may be the same as the multiple antenna receiver 300 shown in FIGS. 3 and 4. The multiple antenna receiver 500 re-inputs a signal, passing through a detection process and an error correction process, into adders 521 and 524, and subtractors/adders 522 and 523 via a re-modulator 591 and a DFT 592.

An addition coefficient used by the adders 521 and 524, and the subtractors/adders 522 and 523 may be represented as, $$AddW_{[x][y]} = \left(\frac{\overline{R_{xy}}}{\overline{R_{xx}}}R_{xx} - R_{xy}\right), y \neq x.$$ [Equation 16]

Figure 6:
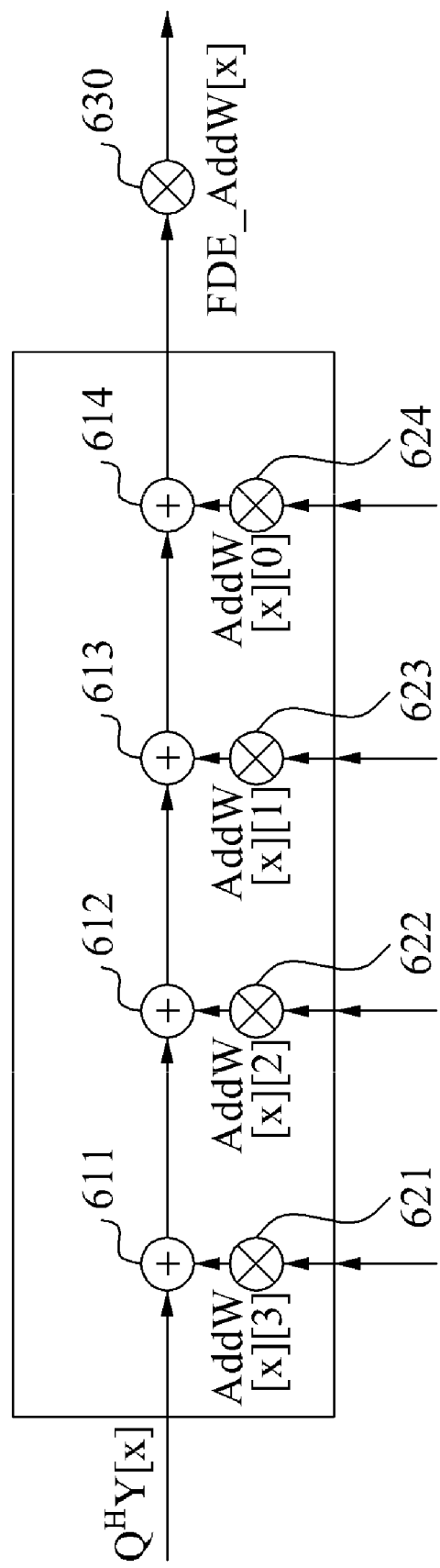
FIG. 6 is a diagram illustrating an adder and FDEs shown in FIG. 5 according to an exemplary embodiment.

FIG. 6 illustrates the adders 521 and 524, and the FDEs 531 and 534 shown in FIG. 5 according to an exemplary embodiment.

Referring to FIG. 6, the adders 521 and 524 comprise a plurality of multipliers 621, 622, 623, and 624, and a plurality of adders 611, 612, 613, and 614.

The plurality of multipliers 621, 622, 623, and 624 may perform an inner product operation for the addition coefficients disclosed in the Equation 16 and output signals of the DFT 592. Outputs obtained from the plurality of multipliers 621, 622, 623, and 624 may be provided to the plurality of adders 611, 612, 613, and 614.

The adder 611 may perform an inner product operation for an output of the multiplier 621 and $Q^H Y[X]$. An output of the adder 611 may be provided to the adjacent adder 612. The adder 612 may add the output of the adder 611 to an output of the multiplier 622. The adder 613 may add an output of the adder 612 to an output of the multiplier 623. The adder 614 may add an output of the adder 613 to an output of the multiplier 624.

Still another multiplier 630 may perform frequency domain equalization for an output of the adder 614 using equalization coefficient FDE_AddW[X].

Figure 7:
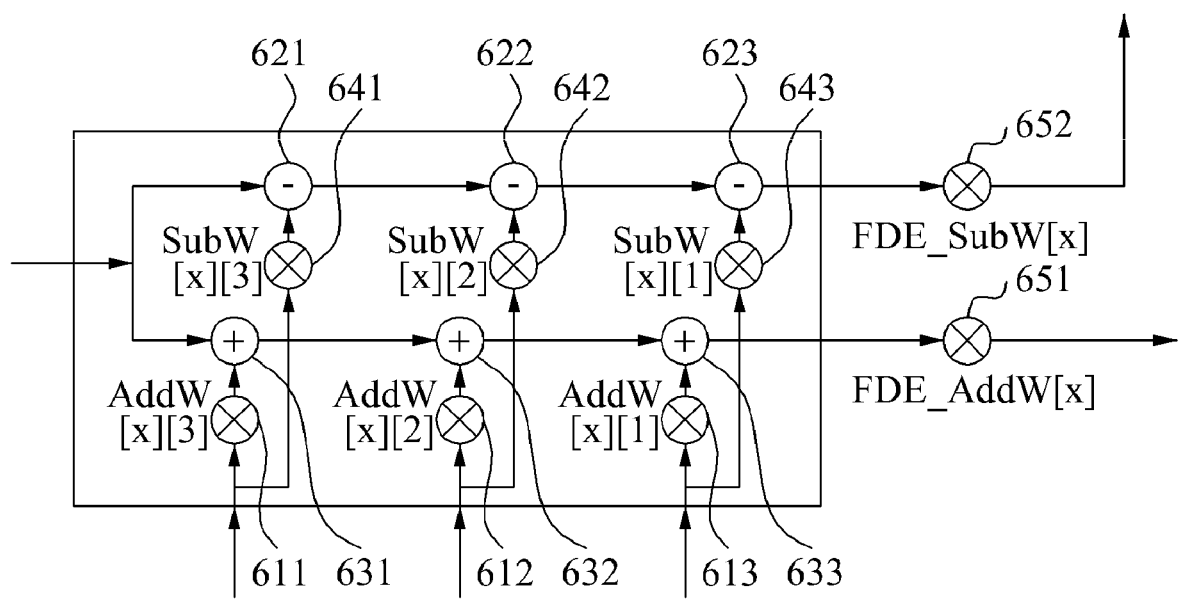
FIG. 7 is a diagram illustrating subtractors/adders and FDEs shown in FIG. 5 according to an exemplary embodiment.

FIG. 7 illustrates the subtractors/adders 522 and 523, and the FDEs 531, 532, 533, and 534 shown in FIG. 5 according to an exemplary embodiment.

Referring to FIG. 7, the subtractors/adders 522 and 523 comprise a plurality of adders 731, 732, and 733, a plurality of subtractors 721, 722, and 723, and a plurality of multipliers 711, 712, 713, 741, 742, 743, 751, and 752.

The multiplier 711 may perform an inner product operation for the output of the DFT 592 and addition coefficient AddW[X][3], and provide an output to the adder 731. The multiplier 712 may perform an inner product operation for the output of the DFT 592 and addition coefficient AddW[X][2], and provide an output to the adder 732. The multiplier 713 may perform an inner product operation for the output of the DFT 592 and addition coefficient AddW[X][1], and provide an output to the adder 733.

The multiplier 741 may perform an inner product operation for the output of the DFT 592 and subtraction coefficient SubW[X][3], and provide an output to the subtractor 721. The multiplier 742 may perform an inner product operation for the output of the DFT 592 and subtraction coefficient SubW[X][2], and provide an output to the subtractor 722. The multiplier 743 may perform an inner product operation for the output of the DFT 592 and subtraction coefficient SubW[X][1] to provide an output to the subtractor 723.

The adder 731 may add $Q^H Y[X]$ and the output of the multiplier 711. The adder 732 may add an output of the adder 731 and the output of the multiplier 712. The adder 733 may add an output of the adder 732 and the output of the multiplier 613.

The subtractor 721 may subtract the output of the multiplier 741 from $Q^H Y[X]$. The subtractor 722 may subtract the output of the multiplier 742 from an output of the subtractor 721. The subtractor 723 may subtract the output of the multiplier 743 from an output of the subtractor 722.

The multiplier 751 may perform frequency domain equalization for an output of the adder 733 using equalization coefficient FDE_AddW[X]. The multiplier 752 may perform frequency domain equalization for an output of the subtractor 723 using equalization coefficient FDE_SubW[X].

Figure 8:
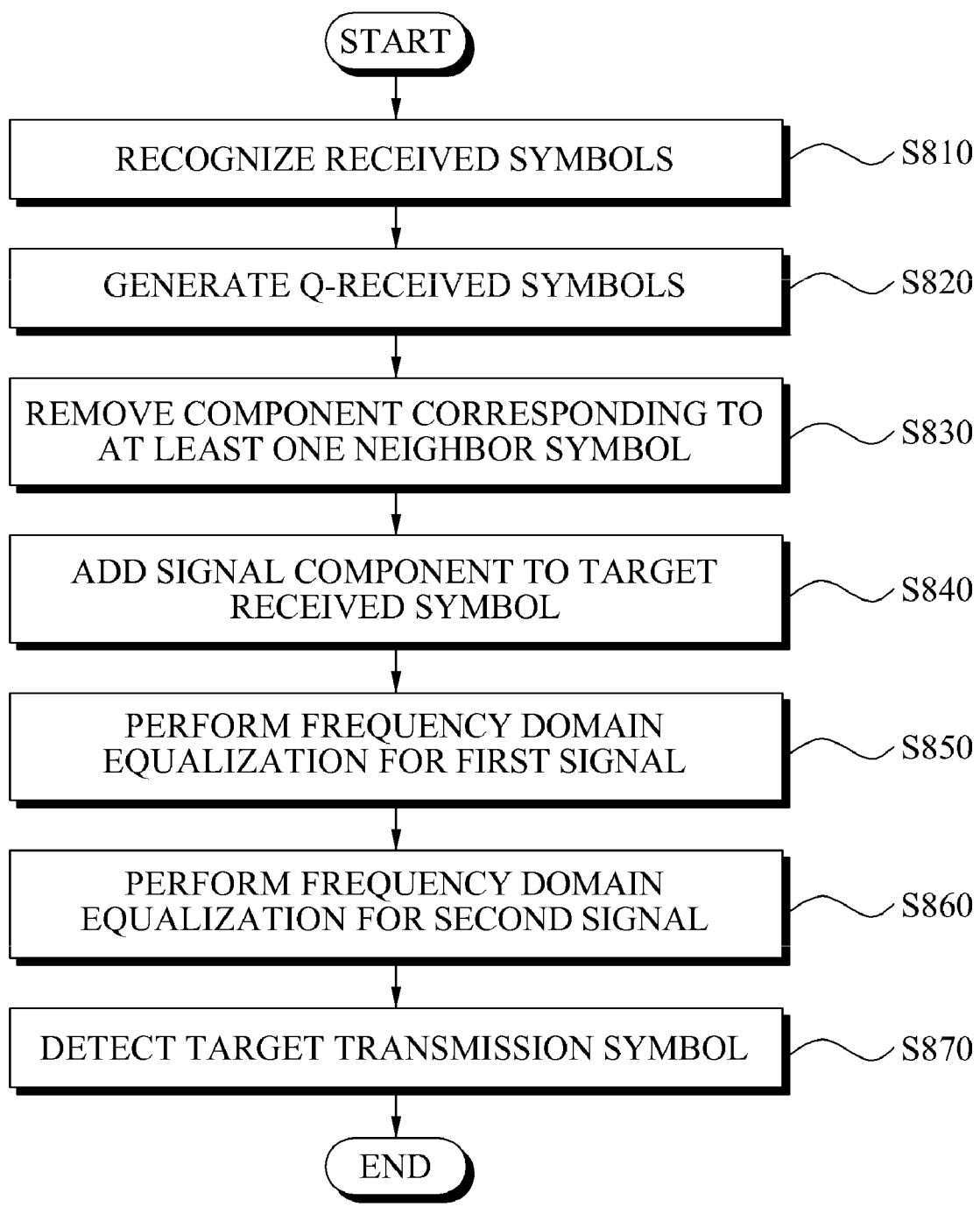
FIG. 8 is a flowchart illustrating a method of receiving a signal according to an exemplary embodiment.

FIG. 8 is a flowchart illustrating a method of receiving a signal according to an exemplary embodiment.

Referring to FIG. 8, in operation S810, the signal receiving method comprises recognizing a plurality of received symbols via a plurality of antennas.

Although not described in FIG. 8, the signal receiving method according to an aspect may perform QR decomposition for a channel matrix to calculate a Q matrix and an R matrix.

In operation S820, the signal receiving method further comprises generating Q-received symbols corresponding to the plurality of antennas based on the plurality of received symbols and the Q matrix.

In operation S830, the signal receiving method further comprises removing a component corresponding to at least one neighbor symbol from a target received symbol corresponding to one of the Q-received symbols.

In operation S840, the signal receiving method further comprises adding a signal component to the target received symbol so that a variation of the at least one neighbor symbol in a frequency domain is equal to a variation of the target received symbol in the frequency domain.

In operation S850, the signal receiving method further comprises performing frequency domain equalization for a first signal in which the component corresponding to the at least one neighbor symbol is removed from the target received symbol.

In operation S860, the signal receiving method further comprises performing frequency domain equalization for a second signal in which a component corresponding to the variation of the at least one neighbor symbol in the frequency domain is added to the target received symbol.

In operation S870, the signal receiving method further comprises detecting a target transmission symbol corresponding to the target received symbol.

The methods described above may be recorded, stored, or fixed in one or more computer-readable media including program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multiple antenna receiver comprising:
a plurality of antennas to receive a plurality of received symbols;
a QR decomposition unit to perform QR decomposition for a channel matrix to calculate a Q matrix and an R matrix;
a Q-received symbol generator to generate Q-received symbols corresponding to the plurality of antennas based on the plurality of received symbols and the Q matrix;
a subtractor to remove a component corresponding to at least one neighbor symbol from a target received symbol corresponding to one of the Q-received symbols;
an adder to add a signal component to the target received symbol so that a variation of the at least one neighbor symbol in a frequency domain is equal to a variation of the target received symbol in the frequency domain;
a first frequency domain equalizer to perform frequency domain equalization for an output of the subtractor; and
a second frequency domain equalizer to perform frequency domain equalization for an output of the adder.

2. The multiple antenna receiver as claimed in claim 1, further comprising:

a detector to detect a target transmission symbol corresponding to the target received symbol based on an output of the second frequency domain equalizer and a neighbor transmission symbol corresponding to the at least one neighbor symbol.

3. The multiple antenna receiver as claimed in claim 2, wherein the detector detects the target transmission symbol based on a maximum-likelihood detection (MLD) scheme.

4. The multiple antenna receiver as claimed in claim 2, wherein the detector calculates an R' matrix based on the R matrix and an equalization coefficient of the second frequency domain equalizer, and detects the target transmission symbol based on the calculated R' matrix.

5. The multiple antenna receiver as claimed in claim 1, wherein the Q-received symbol generator performs an inner product operation for a vector including the plurality of received symbols and a $Q^H$ matrix to generate the Q-received symbols, and the $Q^H$ matrix is a Hermitian matrix of the Q matrix.

6. The multiple antenna receiver as claimed in claim 1, wherein the subtractor calculates a subtraction coefficient based on the R matrix and removes the component corresponding to the at least one neighbor symbol from the target received symbol based on the calculated subtraction coefficient.

7. The multiple antenna receiver as claimed in claim 1, wherein the adder calculates an addition coefficient so that the variation of the at least one neighbor symbol in the frequency domain is equal to the variation of the target received symbol in the frequency domain, and adds the signal component to the target received symbol based on the calculated addition coefficient.

8. The multiple antenna receiver as claimed in claim 7, wherein the adder adds the signal component to the target received symbol based on an average vector of a substream including the at least one neighbor symbol.

9. The multiple antenna receiver as claimed in claim 1, wherein the first frequency domain equalizer and the second frequency domain equalizer calculate equalization coefficients of the first frequency domain equalizer and the second frequency domain equalizer based on the R matrix, and perform frequency domain equalization for the output of the subtractor and the output of the adder based on the calculated equalization coefficients.

10. The multiple antenna receiver as claimed in claim 1, wherein the first frequency domain equalizer and the second frequency domain equalizer perform frequency domain equalization for the output of the subtractor and the output of the adder according to a minimum mean square error (MMSE) equalization scheme.

11. A method of receiving a signal, comprising:
    recognizing a plurality of received symbols via a plurality of antennas;
    performing QR decomposition for a channel matrix to calculate a Q matrix and an R matrix;
    generating Q-received symbols corresponding to the plurality of antennas based on the plurality of received symbols and the Q matrix;
    removing a component corresponding to at least one neighbor symbol from a target received symbol corresponding to one of the Q-received symbols;
    adding a signal component to the target received symbol so that a variation of the at least one neighbor symbol in a frequency domain is equal to a variation of the target received symbol in a frequency domain;
    performing frequency domain equalization for a first signal in which the component corresponding to the at least one neighbor symbol is removed from the target received symbol; and
    performing frequency domain equalization for a second signal in which a component corresponding to the variation of the at least one neighbor symbol in the frequency domain is added to the target received symbol.

12. The method as claimed in claim 11, further comprising:
    detecting a target transmission symbol corresponding to the target received symbol based on the frequency domain equalized second signal and a neighbor transmission symbol corresponding to the at least one neighbor symbol.

13. The method as claimed in claim 12, wherein the detecting comprises calculating an R' matrix based on the R matrix and an equalization coefficient that is used to perform frequency domain equalization for the second signal, and detecting the target transmission symbol based on the calculated R' matrix.

14. The method as claimed in claim 11, wherein the removing comprises calculating a subtraction coefficient based on the R matrix and removing the component corresponding to the at least one neighbor symbol from the target received symbol based on the calculated subtraction coefficient.

15. The method as claimed in claim 12, wherein the adding comprises calculating an addition coefficient so that the variation of the at least one neighbor symbol in the frequency domain is equal to the variation of the target received symbol in the frequency domain, and adding the signal component to the target received symbol based on the calculated addition coefficient.

16. The method as claimed in claim 12, wherein the performing frequency domain equalization for the first signal and the second signal comprises calculating equalization coefficients based on the R matrix to perform frequency domain equalization based on the calculated equalization coefficients.

17. The method of claim 11, wherein the recognizing comprises receiving the plurality of signals via the plurality of antennas.

18. A non-transitory computer-readable storage medium storing a program to receive a signal, comprising instructions to cause a computer to:
    recognize a plurality of received symbols via a plurality of antennas;
    perform QR decomposition for a channel matrix to calculate a Q matrix and an R matrix;
    generate Q-received symbols corresponding to the plurality of antennas based on the plurality of received symbols and the Q matrix;
    remove a component corresponding to at least one neighbor symbol from a target received symbol corresponding to one of the Q-received symbols;
    add a signal component to the target received symbol so that a variation of the at least one neighbor symbol in a frequency domain is equal to a variation of the target received symbol in a frequency domain;
    perform frequency domain equalization for a first signal in which the component corresponding to the at least one neighbor symbol is removed from the target received symbol; and
    perform frequency domain equalization for a second signal in which a component corresponding to the variation of the at least one neighbor symbol in the frequency domain is added to the target received symbol.

* * * * *